March 4, 1969  G. B. STONE  3,430,506
DRIVING PULLEY FOR A BELT CONVEYOR
Filed June 13, 1967
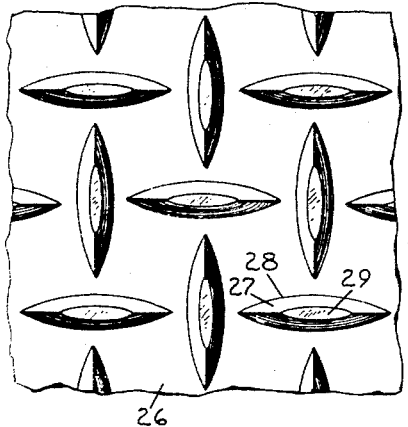
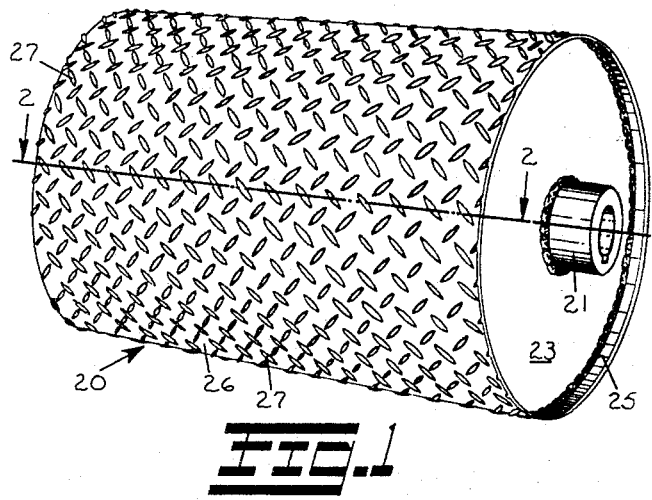
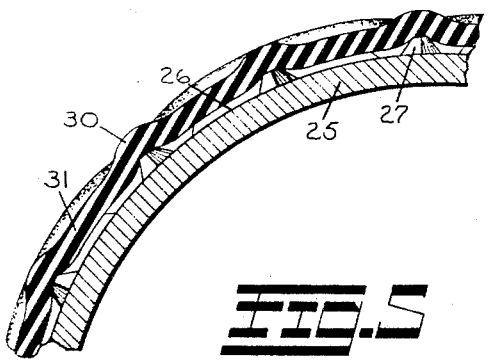
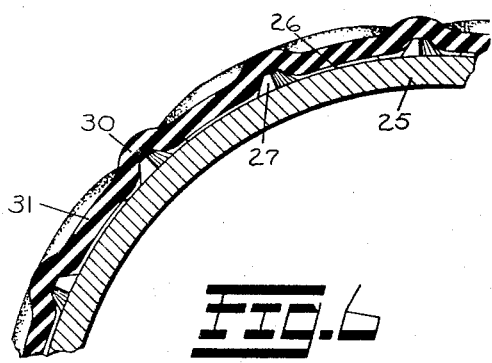
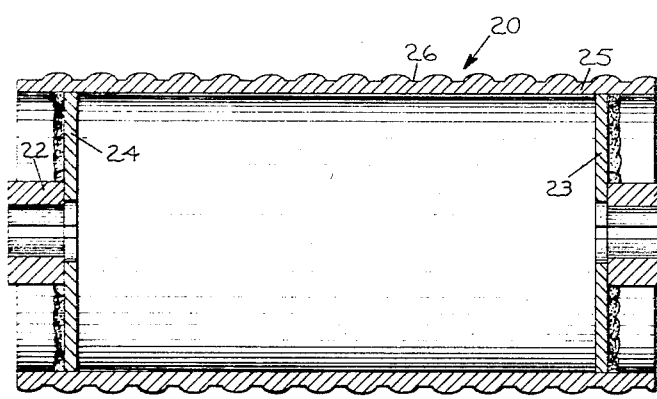
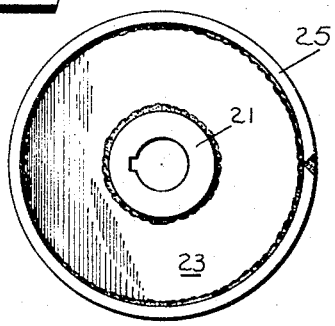
INVENTOR.
GUTHRIE B. STONE
BY *Albert A. Mahannel*
ATTORNEY

United States Patent Office 3,430,506
Patented Mar. 4, 1969

3,430,506
DRIVING PULLEY FOR A BELT CONVEYOR
Guthrie B. Stone, Honeoye, N.Y., assignor to Stone Conveyor Company, Inc., Honeoye, New York
Filed June 13, 1967, Ser. No. 645,696
U.S. Cl. 74—230.5
Int. Cl. F16h 55/38
3 Claims

ABSTRACT OF THE DISCLOSURE

An unlagged conveyor belt pulley having a metallic driving surface with integrally formed projections.

Background of the invention (1) This invention pertains to pulleys or rollers for endless-belt type conveyors and more particularly to the surface structure of those pulleys whereby a driving force may be transmitted to the belt.

(2) Driving pulleys for endless belts have generally functioned through frictional traction effected by various lagging surfaces applied to the pulley. Rubber and other similar materials have been used with satisfactory results in most instances but have been expensive to apply and have added greatly to the overall cost. In addition, these lagging surfaces have proven unsatisfactory in application involving wet materials, as for example, those of mining and food processing.

Summary of the invention

It is a general object of the invention to devise for an endless-belt conveyor a driving pulley having projections formed integrally thereon.

It is a further object to devise a conveyor pulley with a driving surface formed of a commercially available floor plate stock.

It is a further object of the invention to devise a pulley having surface projections with which a belt may be driven by interlocking mechanical forces rather than the usual frictional forces.

It is a still further object to devise a pulley having projections by which the belt will be held suspended from the major portion of the cylindrical pulley surface.

These and other objects of the invention will become apparent as further details are disclosed.

The invention provides integrally formed projections upon the metallic shell of a pulley which may be impressed into the soft and flexible under portion of an endless belt. As the pressure, due to load weight, is increased the projections will be pressed further into the belt but at a gradually decreasing rate because of the supporting taper. With the projections separately impressed into the belt, a mechanical driving motion is imparted which is not unlike that of sprocket action. The belt being suspended between two circumferentially aligned projections, will receive nearly straight-line forces and will not be fully dependent upon friction as in presently known pulleys.

Brief description of the drawing

The invention will be described by reference to a specific embodiment thereof as illustrated in the accompanying figures of drawing, wherein:

FIG. 1 is an elevation in perspective of a pulley with the inventive driving surface thereon;
FIG. 2 is a section taken on line 2—2 in FIG. 1;
FIG. 3 is an end elevation of the pulley of FIG. 1;
FIG. 4 shows a portion of the pulley surface enlarged;
FIG. 5 is a section showing the endless belt being drawn under tension; and
FIG. 6 is similar to FIG. 5 with the belt under high tension.

Description of the preferred embodiment

Now referring to FIGS. 1 and 2, a driving pulley, generally designated 20, has hubs 21 and 22 fastened to end plates 23 and 24 as by welding. A metallic shell 25 is welded to the end plates 23 and 24 to produce a driving pulley without the necessity of lagging the metal surface with rubber or other materials. The shell 25 is formed of commercially available floor plate of steel or aluminum but other metals might be substituted. The shell 25 presents an outer cylindrical surface 26 comprising a major portion of the total surface area.

Extending from the cylindrical surface 26 and integral therewith is a plurality of projections 27 separately arranged in angular relationship. The arrangement and conformation of the projections 27 shown in the preferred embodiment have proven ideally suited for driving a conveyor belt, however, other arrangements and forms may be substituted without departing from the inventive concept. The projections 27 define an elongated arcuated diamond shape at the base area 28 (FIG. 4) and taper outwardly as a frustum to a small similarly shaped outer area 29. The outer areas 29 of the projections 27 are generally concentric with the cylindrical surface 26 and the sum of all outer areas 29 should preferably be less than 5% of the total cylindrical surface area 26. The base areas 28 in combination encompass not over 30% of the cylindrical surface area 26 and are spaced as shown in FIGS. 4 and 5. In the preferred embodiment adjacent projections are positioned perpendicular to each other in such a way that a longitudinal center line of one would bisect laterally two adjacent projections.

In FIGS. 5 and 6 a sectional view of a small portion of an endless belt 30 is shown supported upon a series of projections. It will be seen that under both degrees of tension the projections will be depressed into the belt in an interlocking condition so that between adjacent projections the belt assumes a generally straight line as at 31. As the pulley is rotated by outside forces (not shown) the belt will be drawn by sprocket type of action and will not depend upon frictional contact with the cylindrical surface. This permits the use of a Teflon coating on the pulley to aid in releasing fine or sticky materials and even with its low coefficient of friction the belt traction of the pulley is not adversely affected. The belt by being generally suspended upon the projections is not subject to damage due to freeze-up as is the case with smooth surface pulleys. The flexing action of the projections tends to break away any ice formation on the belt at the points of contact.

While one embodiment of the invention has been disclosed, it is to be understood that the inventive concept may be carried out in a number of ways. This invention is, therefore, not to be limited to the precise details described, but is intended to embrace all variations and modifications thereof falling within the spirit of the invention and the scope of the claims.

I claim:
1. A driving pulley for the endless belt of a conveyor comprising:
    (a) a metallic shell forming a cylindrical surface,
    (b) a plurality of elongated projections separately arranged in angular relationship integral with said surface,
    (c) said projections each defining an outwardly directed frusto-taper encompassing a base area upon said surface and tapering outwardly to an outer area, the combined base areas of said plurality of projections encompassing a minor portion of the area of said cylindrical surface.
2. A driving pulley as defined in claim 1 wherein each of said projections further defines an elongated arcuated diamond shape extending generally perpendicularly with each of said projections adjacent thereto.

3. A driving pulley as defined in claim 2 wherein an extended longitudinal center line through each of said projections is positioned to laterally bisect two of said projections adjacent therewith.

References Cited

UNITED STATES PATENTS

| | | | |
|---|---|---|---|
| 684,305 | 10/1901 | Pfund | 74—230.5 |
| 1,810,636 | 6/1931 | Adler et al. | 74—230.5 XR |
| 2,724,974 | 11/1955 | Ayres | 74—229 |

FOREIGN PATENTS

| | | |
|---|---|---|
| 10,721 | 8/1889 | Great Britain. |
| 1,113,501 | 12/1955 | France. |
| 1,122,573 | 5/1956 | France. |

FRED C. MATTERN, JR., *Primary Examiner.*

JAMES A. WONG, *Assistant Examiner.*

U.S. Cl. X.R.

29—121